(12) United States Patent
Telefus

(10) Patent No.: US 9,019,724 B2
(45) Date of Patent: Apr. 28, 2015

(54) HIGH POWER CONVERTER ARCHITECTURE

(75) Inventor: Mark Telefus, Orinda, CA (US)

(73) Assignee: Flextronics AP, LLC, Broomfield, CO (US)

( * ) Notice: Subject to any disclaimer, the term of this patent is extended or adjusted under 35 U.S.C. 154(b) by 179 days.

(21) Appl. No.: 13/560,847

(22) Filed: Jul. 27, 2012

(65) Prior Publication Data

US 2014/0029312 A1  Jan. 30, 2014

(51) Int. Cl.
*H02M 3/335* (2006.01)
*H02M 1/34* (2007.01)

(52) U.S. Cl.
CPC .... *H02M 3/33523* (2013.01); *H02M 2001/342* (2013.01); *Y02B 70/1433* (2013.01); *Y02B 70/1491* (2013.01)

(58) Field of Classification Search
CPC . H02M 3/325; H02M 3/335; H02M 3/33523; H02M 3/33507; H02M 3/338
USPC .......................................... 363/16, 20–21.18
See application file for complete search history.

(56) References Cited

U.S. PATENT DOCUMENTS

| | | | |
|---|---|---|---|
| 4,273,406 A | 6/1981 | Okagami | |
| 4,563,731 A | 1/1986 | Sato et al. | |
| 4,645,278 A | 2/1987 | Yevak et al. | |
| 4,712,160 A | 12/1987 | Sato et al. | |
| 4,788,626 A | 11/1988 | Neidig et al. | |
| 4,806,110 A | 2/1989 | Lindeman | |
| 4,841,220 A | 6/1989 | Tabisz et al. | |
| 4,857,822 A | 8/1989 | Tabisz et al. | |
| 4,866,367 A | 9/1989 | Ridley et al. | |
| 4,890,217 A | 12/1989 | Conway | |
| 4,893,227 A | 1/1990 | Gallios et al. | |
| 4,899,256 A | 2/1990 | Sway-Tin | |

(Continued)

FOREIGN PATENT DOCUMENTS

JP    4217869 A    8/1992
JP    10243640 A   9/1998

(Continued)

OTHER PUBLICATIONS

EE Times.com—"Team Claims Midrange Wireless Energy Transfer," by R. Colin Johnson, 4 pages, Nov. 6, 2007.

(Continued)

*Primary Examiner* — Gary L Laxton
*Assistant Examiner* — Kyle J Moody
(74) *Attorney, Agent, or Firm* — Haverstock & Owens LLP

(57) ABSTRACT

The power converter is an integration of three topologies which include a forward converter topology, a flyback converter topology, and a resonant circuit topology. The combination of these three topologies functions to transfer energy using three different modes. A first mode, or forward mode, is a forward energy transfer that forwards energy from the input supply to the output load in a manner similar to a forward converter. A second mode, or flyback mode, stores and releases energy in a manner similar to a flyback converter. A third mode, or resonant mode, stores and releases energy from the resonant tank using a resonant circuit and a secondary side forward-type converter topologies. An output circuit of the power converter is configured as a forward-type converter including two diodes and an inductor. The output circuit is coupled to a secondary winding of a converter transformer.

24 Claims, 7 Drawing Sheets

(56) References Cited

U.S. PATENT DOCUMENTS

| | | | |
|---|---|---|---|
| 5,090,919 A | 2/1992 | Tsuji | |
| 5,101,322 A | 3/1992 | Ghaem et al. | |
| 5,132,890 A | 7/1992 | Blandino | |
| 5,235,491 A | 8/1993 | Weiss | |
| 5,365,403 A | 11/1994 | Vinciarelli et al. | |
| 5,673,185 A | 9/1997 | Albach et al. | |
| 5,712,772 A | 1/1998 | Telefus et al. | |
| 5,768,118 A | 6/1998 | Faulk et al. | |
| 5,786,992 A | 7/1998 | Vinciarelli et al. | |
| 5,790,395 A | 8/1998 | Hagen | |
| 5,811,895 A | 9/1998 | Suzuki et al. | |
| 5,831,838 A * | 11/1998 | Illingworth | 363/21.03 |
| 5,838,554 A | 11/1998 | Lanni | |
| 5,859,771 A | 1/1999 | Kniegl | |
| 5,905,369 A | 5/1999 | Ishii et al. | |
| 5,923,543 A | 7/1999 | Choi | |
| 5,978,238 A | 11/1999 | Liu | |
| 6,009,008 A | 12/1999 | Pelly | |
| 6,091,611 A | 7/2000 | Lanni | |
| 6,183,302 B1 | 2/2001 | Daikuhara et al. | |
| 6,188,587 B1 | 2/2001 | Yun et al. | |
| 6,191,957 B1 | 2/2001 | Peterson | |
| 6,272,015 B1 | 8/2001 | Mangtani | |
| 6,275,397 B1 | 8/2001 | McClain | |
| 6,304,473 B1 * | 10/2001 | Telefus et al. | 363/97 |
| 6,307,761 B1 | 10/2001 | Nakagawa | |
| 6,323,627 B1 | 11/2001 | Schmiederer et al. | |
| 6,324,079 B1 * | 11/2001 | Collmeyer et al. | 363/21.15 |
| 6,385,059 B1 | 5/2002 | Telefus et al. | |
| 6,388,897 B1 | 5/2002 | Ying et al. | |
| 6,390,854 B2 | 5/2002 | Yamamoto et al. | |
| 6,396,716 B1 | 5/2002 | Liu et al. | |
| 6,459,175 B1 | 10/2002 | Potega | |
| 6,487,098 B2 | 11/2002 | Malik et al. | |
| 6,549,409 B1 | 4/2003 | Saxelby et al. | |
| 6,650,552 B2 | 11/2003 | Takagi et al. | |
| 6,721,192 B1 | 4/2004 | Yang et al. | |
| 6,775,162 B2 | 8/2004 | Mihai et al. | |
| 6,894,461 B1 | 5/2005 | Hack et al. | |
| 6,919,715 B2 | 7/2005 | Muratov et al. | |
| 6,961,252 B2 * | 11/2005 | Takada | 363/23 |
| 7,035,126 B1 | 4/2006 | Lanni | |
| 7,038,406 B2 | 5/2006 | Wilson | |
| 7,102,251 B2 | 9/2006 | West | |
| 7,139,180 B1 | 11/2006 | Herbert | |
| 7,202,640 B2 | 4/2007 | Morita | |
| 7,208,833 B2 | 4/2007 | Nobori et al. | |
| 7,212,420 B2 | 5/2007 | Liao | |
| 7,239,532 B1 | 7/2007 | Hsu et al. | |
| 7,274,175 B2 | 9/2007 | Manolescu | |
| 7,304,464 B2 | 12/2007 | Weng et al. | |
| 7,315,460 B2 | 1/2008 | Kyono | |
| 7,386,286 B2 | 6/2008 | Petrovic et al. | |
| 7,450,388 B2 | 11/2008 | Beihoff et al. | |
| 7,499,301 B2 | 3/2009 | Zhou | |
| 7,545,256 B2 | 6/2009 | O'Toole et al. | |
| 7,564,706 B1 | 7/2009 | Herbert | |
| 7,701,305 B2 | 4/2010 | Lin et al. | |
| 7,830,684 B2 | 11/2010 | Taylor | |
| 7,924,578 B2 | 4/2011 | Jansen et al. | |
| 7,924,579 B2 * | 4/2011 | Arduini | 363/21.06 |
| 8,059,434 B2 | 11/2011 | Huang et al. | |
| 8,102,678 B2 | 1/2012 | Jungreis | |
| 8,126,181 B2 | 2/2012 | Yamamoto et al. | |
| 8,134,848 B2 | 3/2012 | Whittam et al. | |
| 8,155,368 B2 | 4/2012 | Cheung et al. | |
| 8,207,717 B2 | 6/2012 | Uruno et al. | |
| 8,213,666 B2 | 7/2012 | Groesch | |
| 8,243,472 B2 | 8/2012 | Chang et al. | |
| 8,369,111 B2 | 2/2013 | Balakrishnan et al. | |
| 8,400,801 B2 | 3/2013 | Shinoda | |
| 8,743,565 B2 * | 6/2014 | Telefus | 363/21.02 |
| 2002/0008963 A1 | 1/2002 | Dibene, II et al. | |
| 2002/0011823 A1 | 1/2002 | Lee | |
| 2002/0036200 A1 | 3/2002 | Ulrich et al. | |
| 2003/0035303 A1 | 2/2003 | Balakrishman et al. | |
| 2003/0112645 A1 | 6/2003 | Schlecht | |
| 2004/0062061 A1 | 4/2004 | Bourdillon | |
| 2004/0183510 A1 | 9/2004 | Sutardja et al. | |
| 2004/0252529 A1 | 12/2004 | Huber et al. | |
| 2005/0024016 A1 | 2/2005 | Breen et al. | |
| 2005/0036338 A1 | 2/2005 | Porter et al. | |
| 2005/0117376 A1 | 6/2005 | Wilson | |
| 2005/0138437 A1 | 6/2005 | Allen et al. | |
| 2005/0194942 A1 | 9/2005 | Hack et al. | |
| 2005/0225257 A1 | 10/2005 | Green | |
| 2005/0254268 A1 | 11/2005 | Reinhard et al. | |
| 2005/0270001 A1 | 12/2005 | Jitaru | |
| 2006/0002155 A1 | 1/2006 | Syteynberg et al. | |
| 2006/0022637 A1 | 2/2006 | Wang et al. | |
| 2006/0152947 A1 | 7/2006 | Baker et al. | |
| 2006/0232220 A1 | 10/2006 | Melis | |
| 2007/0040516 A1 | 2/2007 | Chen | |
| 2007/0086224 A1 | 4/2007 | Phadke et al. | |
| 2007/0120542 A1 | 5/2007 | LeMay | |
| 2007/0121981 A1 | 5/2007 | Koh et al. | |
| 2007/0138971 A1 | 6/2007 | Chen | |
| 2007/0247091 A1 | 10/2007 | Maiocchi | |
| 2007/0263415 A1 | 11/2007 | Jansen et al. | |
| 2007/0287447 A1 | 12/2007 | Cornell | |
| 2007/0298653 A1 | 12/2007 | Mahoney et al. | |
| 2008/0018265 A1 | 1/2008 | Lee et al. | |
| 2008/0043496 A1 | 2/2008 | Yang | |
| 2008/0191667 A1 | 8/2008 | Kernahan et al. | |
| 2009/0034299 A1 | 2/2009 | Lev | |
| 2009/0196073 A1 | 8/2009 | Nakahori | |
| 2009/0290384 A1 | 11/2009 | Jungreis | |
| 2009/0290385 A1 | 11/2009 | Jungreis et al. | |
| 2010/0039833 A1 | 2/2010 | Coulson et al. | |
| 2010/0067259 A1 * | 3/2010 | Liu | 363/21.01 |
| 2010/0110732 A1 | 5/2010 | Moyer | |
| 2010/0289466 A1 | 11/2010 | Telefus et al. | |
| 2010/0322441 A1 | 12/2010 | Weiss et al. | |
| 2011/0132899 A1 | 6/2011 | Shimomugi et al. | |
| 2011/0261590 A1 | 10/2011 | Liu | |
| 2012/0112657 A1 | 5/2012 | Van Der Veen et al. | |
| 2013/0148385 A1 | 6/2013 | Zhang | |
| 2014/0029313 A1 * | 1/2014 | Telefus | 363/21.02 |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |
| JP | 2009177909 A | 8/2009 |
| JP | 2009278822 A | 11/2009 |
| KR | 1019990069442 | 9/1999 |

OTHER PUBLICATIONS

EE Times.com—"Wireless Beacon Could Recharge Consumer Devices," by R. Colin Johnson, 3 pages, Nov. 6, 2007.

Hang-Seok Choi et al. Novel Zero-Voltage and Zero-Current-Switiching (ZVZCS) Full-Bridge PWM Converter Using Coupled Output Inductor, Sep. 2002 IEEE, pp. 641-648.

"New Architectures for Radio-Frequency dc/dc Power Conversion," Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters," Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression," K.K. Tse, et al. Member IEEE, IEEE Transactions on Power Electronics, vol. 15., No. 2, Mar. 2000, pp. 399-410.

International Search Report, PCT/US2011/49438, International Filing Date Aug. 26, 2011, 10 pages.

* cited by examiner

HIGH POWER CONVERTER ARCHITECTURE

FIELD OF THE INVENTION

The present invention is generally directed to the field of power converters. More specifically, the present invention is directed to a new power converter architecture having increased efficiency.

BACKGROUND OF THE INVENTION

There are several power converter topologies that have been developed over the years, which are intended to improve the power density and switching efficiency of power converters. An emerging focus of new converter topologies is to provide a means to reduce or eliminate converter switching losses, while increasing the switching frequencies. Lower loss and higher switching frequency means more efficient converters, which can reduce the size and weight of converter components. Additionally, with the introduction of high speed composite semiconductor switches, such as metal oxide semiconductor field effect transistor (MOSFET) switches operated by pulse width modulation (PWM), recent forward and flyback topologies are now capable of operation at greatly increased switching frequencies, such as, for example, up to 1.0 MHz.

However, an increase in switching frequency can cause a corresponding increase in switching and component stress related losses, as well as increased electromagnetic interference (EMI), noise, and switching commutation problems, due to the rapid ON/OFF switching of the semiconductor switches at high voltage and/or high current levels. Moreover, modern electronic components are expected to perform multiple functions, in a small space, efficiently, and with few undesirable side effects. For instance, a modern voltage converter that provides for relatively high power density and high switching frequencies, should also include uncluttered circuit topologies, provide for isolation of the output or "load" voltage from the input or "source" voltage, and also provide for variable step-up or step-down voltage transformation.

FIG. 1 illustrates a conventional flyback type voltage converter. The converter 10 includes a transistor T1, a controller 14, a transformer 12, a capacitor C1, and a diode D1. Input voltage to the circuit may be unregulated DC voltage derived from an AC supply after rectification and filtering. The transistor T1 is a fast-switching device, such as a MOSFET, the switching of which is controlled by a fast dynamic controller 14 to maintain a desired output voltage Vout. The secondary winding voltage is rectified and filtered using the diode D1 and the capacitor C1. The transformer 12 of the flyback converter functions differently than a typical transformer. Under load, the primary and secondary windings of a typical transformer conduct simultaneously. However, in the flyback converter, the primary and secondary windings of the transformer do not carry current simultaneously. In operation, when the transistor T1 is turned ON, the primary winding of the transformer 12 is connected to the input supply voltage such that the input supply voltage appears across the primary winding, resulting in an increase of magnetic flux in the transformer 12 and the primary winding current rises linearly. However, with the transistor T1 turned ON, the diode D1 is reverse biased and there is no current through the secondary winding. Even though the secondary winding does not conduct current while the transistor T1 is turned ON, the load, represented as resistor Rload, coupled to the capacitor C1 receives uninterrupted current due to previously stored charge on the capacitor.

When the transistor T1 is turned OFF, the primary winding current path is broken and the voltage polarities across the primary and secondary windings reverse, making the diode D1 forward biased. As such, the primary winding current is interrupted but the secondary winding begins conducting current thereby transferring energy from the magnetic field of the transformer to the output of the converter. This energy transfer includes charging the capacitor C1 and delivery energy to the load. If the OFF period of the transistor T1 is sufficiently long, the secondary current has sufficient time to decay to zero and the magnetic field energy stored in the transformer 12 is completely dissipated.

The flyback topology has long been attractive because of its relative simplicity when compared with other topologies used in low power application. The flyback "transformer" serves the dual purpose of providing energy storage as well as converter isolation, theoretically minimizing the magnetic component count when compared with, for example, the forward converter. A drawback to use of the flyback is the relatively high voltage and current stress suffered by the switching components. Additionally, high turn-off voltage (caused by the parasitic oscillation between transformer leakage inductance and switch capacitance) seen by the primary switch traditionally requires the use of a resistor, capacitor, diode subcircuit, such as a snubber circuit. This parasitic oscillation is extremely rich in harmonics and pollutes the environment with EMI, and causes high switching losses from the switching components in the form of extra thermal dissipation.

FIG. 2 illustrates a conventional forward type voltage converter. The converter 20 includes a transistor T1, a controller 24, a transformer 22, a capacitor C1, diodes D1 and D2, and an inductor L1. As with the flyback converter, input voltage to the circuit may be unregulated DC voltage derived from an AC supply after rectification and filtering. The transistor T1 is a fast-switching device, such as a MOSFET, the switching of which is controlled by a fast dynamic controller 24 to maintain a desired output voltage Vout. The secondary winding voltage is rectified and filtered using the diode D1 and the capacitor C1. The load, represented as resistor Rload, is coupled across the rectified output of the secondary winding. The transformer 22 is desired to be an ideal transformer with no leakages, zero magnetizing current, and no losses. In operation, when the transistor T1 is turned ON, the primary winding of the transformer 22 is connected to the input supply voltage such that the input supply voltage appears across the primary winding and simultaneously a scaled voltage appears across the secondary winding. The diode D1 is forward biased when the transistor T1 is turned ON, and the scaled voltage across the secondary winding is applied to the low pass filter circuit preceding the load. The diode D2 is reverse biased and therefore does not conduct current when the transistor T1 is turned ON. In the case of an ideal transformer, no energy is stored in the transformer, unlike the flyback converter. The scaled voltage is supplied as a constant output voltage when the transistor T1 is turned ON.

When the transistor T1 is turned OFF, the primary winding current path is broken and the voltage polarities across the primary and secondary windings reverse, making the diode D1 reversed biased and the diode D2 forward biased. The result is zero current flow through both the primary and secondary windings. However, the forward biased diode D2 provides a freewheeling path for uninterrupted current to continue to flow through the inductor L1 and the load. The inductor L1 provides the magnetic flux to maintain this current flow while the transistor T1 is turned OFF. When the transistor T1 is turned OFF, there is no power flow from the input source to the load, but the output voltage is maintained nearly constant by a relatively large capacitor C1. The charged capacitor C1 and the inductor L1 provide continuity in load voltage. However, since there is no input power when the transistor T1 is turned OFF, the stored energy in the capacitor C1 and the inductor L1 slowly dissipate. The switching frequency of the transistor T1 is set to maintain the output voltage within a required tolerance.

As with the flyback converter, the non-ideal nature of the forward converter results in noise and loses that reduce efficiency.

In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. Resonant switching techniques generally include an inductor-capacitor (LC) subcircuit in series with a semiconductor switch which, when turned ON, creates a resonating subcircuit within the converter. Further, timing the ON/OFF control cycles of the resonant switch to correspond with particular voltage and current conditions across respective converter components during the switching cycle allows for switching under zero voltage and/or zero current conditions. Zero voltage switching (ZVS) and/or zero current switching (ZCS) inherently reduces or eliminates many frequency related switching losses.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic.

Several power converter topologies have been developed utilizing resonant switching techniques, for example U.S. Pat. No. 7,764,515 entitled "Two Terminals Quasi Resonant Tank Circuit," to Jansen et al. (Jansen), which is hereby incorporated in its entirety by reference. Jansen is directed to a flyback type converter including a quasi-resonant tank circuit. FIG. 3 illustrates the flyback type converter of Jansen. The quasi-resonant flyback converter 30 is similar to the flyback converter 10 of FIG. 1 with the addition of a quasi resonant tank circuit formed by a transistor T2, diodes D2, D3, and D4, and capacitors C2 and C3. When the transistor T1 is turned ON, the transistor T2 is turned OFF, and the primary winding of the transformer 32 is connected to the input supply voltage such that the input supply voltage appears across the primary winding, resulting in an increase of magnetic flux in the transformer 32 and the primary winding current rises linearly. No current flows through the secondary winding of the transformer 32 because the diode D1 is reverse biased. When the transistor T1 is turned OFF, the transistor T2 turns ON parametrically, without control of a separate control circuit. The diodes D2, D3, and D4 and the capacitor C3 function as driving circuitry for the transistor T2. With the transistor T2 turned ON, the capacitor C2 is essentially coupled in parallel to the transformer 32, and the energy previously stored in the primary winding causes current to circulate in the circuit formed by the capacitor C2 and the primary winding, forming a resonant tank. As with the flyback converter of FIG. 1, energy stored in the primary winding is delivered to the load while the transistor T1 is turned OFF. However, in the quasi-resonant flyback converter 30 of FIG. 3, a portion of the resonant energy generated in the resonant tank is also delivered to the load while the transistor T1 is turned OFF and the transistor T2 is turned ON. In this manner, the quasi-resonant flyback converter 30 of FIG. 3 delivers peak energy equal to energy from the typical flyback operation plus the resonant energy. However, current flow within the resonant tank cycles between positive and negative current flow through the primary winding. The configuration of the secondary side circuit, in particular the diode D1, only allows delivery of resonant energy during one direction of primary winding current flow. Resonant energy corresponding to the other direction of primary current flow is not delivered.

In addition to providing an increase in peak energy, the quasi-resonant flyback converter of FIG. 3 provides the conventional advantages associated with a resonant circuit, such as reduced frequency dependent losses and EMI. However, the increased energy delivered by the quasi-resonant flyback converter is still less than the energy delivered by the forward converter.

SUMMARY OF THE INVENTION

The power converter is an integration of three topologies which include a forward converter topology, a flyback converter topology, and a resonant circuit topology. The combination of these three topologies functions to transfer energy in three different modes. A first mode, or forward mode, is a forward energy transfer that forwards energy from the input supply to the output load in a manner similar to a forward converter. A second mode, or flyback mode, stores and releases energy in a manner similar to a flyback converter. A third mode, or resonant mode, stores and releases energy from a resonant tank using the resonant circuit and secondary side forward-type converter topologies. An output circuit of the power converter is configured as a forward-type converter including two diodes and an inductor. The output circuit is coupled to a secondary winding of a converter transformer.

In an aspect, a power converter circuit includes a transformer, an output circuit, a primary switch, a resonant circuit, and a controller. The transformer has a primary winding coupled to an input supply voltage and a secondary winding. The output circuit is coupled to the secondary winding, wherein the output circuit includes a first diode, a second diode, an inductor, and a capacitor. The first diode and the second diode are coupled to the secondary winding of the transformer such that when the first diode is forward biased, the second diode is reverse biased, and when the first diode is reverse biased, the second diode is forward biased. The primary switch is coupled in series to the primary winding. The resonant circuit is coupled in parallel to the primary winding, wherein the resonant circuit includes an auxiliary switch and a resonant tank. The controller is coupled to the primary switch. The power converter circuit is configured to forward energy from the input supply voltage to the output circuit, to store energy from leakage inductance, magnetizing inductance, and parasitic capacitances as resonant energy in the resonant tank, and to deliver the stored resonant energy to the output circuit.

In some embodiments, the power converter circuit is configured to forward energy from the input supply voltage to the output circuit when the primary switch is ON. In some embodiments, the parasitic capacitances include parasitic capacitances from the auxiliary switch and the primary switch. In some embodiments, the resonant energy is delivered over an entire resonant cycle of the resonant tank, wherein the resonant tank includes the primary winding and the resonant cycle includes a positive primary winding current flow and a negative primary winding current flow. In some embodiments, energy delivered to the output load includes a summation of energy forwarded from the input supply, resonant energy stored and released by the resonant tank, and parasitic capacitances and leakage inductance stored and released as additional resonant energy by the resonant tank. In some embodiments, the auxiliary switch is a parametrically controlled auxiliary switch. In some embodiments, the power converter circuit also includes driving circuitry coupled to the auxiliary switch and to the primary switch, wherein the driving circuitry is configured to parametrically control the auxiliary switch according to a voltage condition of the primary switch. In some embodiments, the resonant circuit, the transformer, and the output circuit are configured to store and release the resonant energy and the additional resonant energy according to a flyback mode of energy conversion. In some embodiments, during the flyback mode of energy conversion, the primary switch is OFF. In some embodiments, an anode of the first diode is coupled to a first terminal of the secondary winding, an anode of the second diode is coupled to a second terminal of the secondary winding, a cathode of the first diode and a cathode of the second diode are each coupled to a first terminal of the inductor, and a second terminal of the inductor is coupled to the capacitor. In some embodiments, a primary winding current rises linearly to a peak value when the primary switch is ON.

In another aspect, a power converter circuit includes a transformer, an output circuit, a primary switch, a resonant circuit, driving circuitry, and a controller. The transformer has a primary winding coupled to an input supply voltage and a secondary winding. The output circuit is coupled to the secondary winding. The output circuit includes a first diode, a second diode, an inductor, and a capacitor. The first diode and the second diode are coupled to the secondary winding of the transformer such that when the first diode is forward biased, the second diode is reverse biased, and when the first diode is reverse biased, the second diode is forward biased. The primary switch is coupled in series to the primary winding. The resonant circuit is coupled in parallel to the primary winding, wherein the resonant circuit includes an auxiliary switch and a resonant tank. The driving circuitry is coupled to the auxiliary switch and to the primary switch. The driving circuitry is configured to parametrically control the auxiliary switch according to a voltage condition of the primary switch. The controller is coupled to the primary switch. The power converter circuit is configured to forward energy from the input supply voltage to the output circuit, to store energy from leakage inductance, magnetizing inductance, and parasitic capacitances as resonant energy in the resonant tank, and to deliver the stored resonant energy to the output circuit. In some embodiments, an anode of the first diode is coupled to a first terminal of the secondary winding, an anode of the second diode is coupled to a second terminal of the secondary winding, a cathode of the first diode and a cathode of the second diode are each coupled to a first terminal of the inductor, and a second terminal of the inductor is coupled to the capacitor.

In yet another aspect, a method of transferring energy using a power converter is disclosed. The method includes configuring a power converter. The power converter includes a transformer having a primary winding coupled to an input supply voltage and a secondary winding, an output circuit having an inductor coupled to the secondary winding, and a primary switch coupled in series to the primary windings. The method also includes forwarding energy from the input supply voltage to the output circuit while the primary switch is ON. The method also includes I.forming a resonant tank including the primary winding when the primary switch is OFF, wherein the resonant tank includes resonant energy derived from stored magnetizing inductance, stored leakage inductance and parasitic capacitances. The method also includes delivering the resonant energy in the resonant tank to the output circuit while the primary switch is OFF.

In some embodiments, energy is continuously transferred from a primary side of the power converter to the output circuit while the primary switch is both ON and OFF. In some embodiments, the parasitic capacitances include parasitic capacitances from the auxiliary switch and the primary switch. In some embodiments, the resonant energy is delivered over an entire resonant cycle of the resonant tank, wherein the resonant tank includes the primary winding and the resonant cycle includes a positive primary winding current flow and a negative primary winding current flow. In some embodiments, energy delivered to the output load includes a summation of energy forwarded from the input supply, resonant energy stored and released by the resonant tank, and parasitic capacitances and leakage inductance stored and released as additional resonant energy by the resonant tank. In some embodiments, the method also includes controlling the auxiliary switch through self-commutation. In some embodiments, the auxiliary switch turns ON and OFF according to a voltage condition of the primary switch. In some embodiments, the resonant energy is stored and delivered according to a flyback mode of energy conversion. In some embodiments, during the flyback mode of energy conversion, the primary switch is OFF. In some embodiments, the output circuit includes a first diode, a second diode, and a capacitor, wherein the first diode and the second diode are coupled to the secondary winding of the transformer such that when the first diode is forward biased, the second diode is reverse biased, and when the first diode is reverse biased, the second diode is forward biased. In some embodiments, a primary winding current rises linearly to a peak value when the primary switch is ON.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 4:
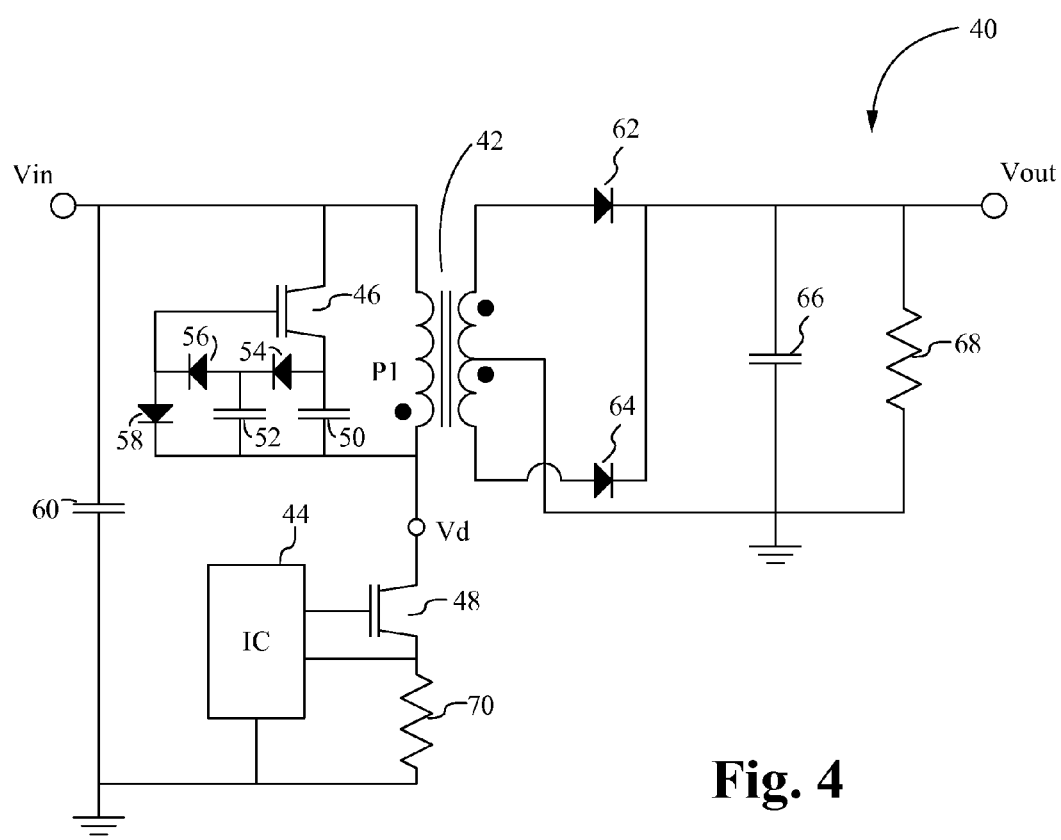
FIG. 4 illustrates a power converter according to an embodiment.

FIG. 4 illustrates a power converter according to an embodiment. The power converter 40 is configured to receive an unregulated DC voltage signal at an input node Vin and to provide a regulated output voltage Vout. Input voltage to the circuit may be unregulated DC voltage derived from an AC supply after rectification. The input voltage is typically filtered, such as via capacitor 60. In some embodiments, the output voltage level is suitable for many low voltage appliances such as computer laptops, cell phones and other hand held devices. In an exemplary embodiment the output voltage Vout can be set within the range 5-40 VDC. Alternatively, the power converter 100 can provide the output voltage Vout that is less than 5 VDC. In other embodiments, the output voltage level is suitable for high power applications greater than 40 VDC.

The power converter 40 includes power conversion and resonant circuitry. In some embodiments, the power converter is configured to include attributes from a flyback converter and a forward converter to perform power conversion. In general, the power converter can include configurations of switch mode power supplies known to a person of skill in the art. Additionally, the power converter includes a resonant tank and is configured to delivery resonant energy to a load. The power converter 40 includes a primary switch 48, an auxiliary switch 46, a controller 44, a transformer 42, and a capacitor 50. The primary switch 48 is coupled in series with a primary winding of the transformer 42. The auxiliary switch 46 is coupled in series with the capacitor 50, and the serially coupled auxiliary switch 46 and capacitor 50 are coupled in parallel to the primary winding of the transformer 42.

The primary switch 48 and the auxiliary switch 46 are each a suitable switching device. In an exemplary embodiment, the primary switch 48 and the auxiliary switch 46 are each a n-type metal-oxide-semiconductor field-effect transistor (MOSFET) device. Alternatively, any other semiconductor switching device known to a person of skill in the art can be substituted for the primary switch 48 and/or the auxiliary switch 46. The primary switch 48 is controlled by the controller 44. In some embodiments, the controller 44 includes a pulse width modulation (PWM) circuit. The controller 44 regulates the duty cycle of the primary switch 48 with the PWM circuit. The controller 44 can sense voltage and/or current conditions within the circuit, such as the voltage and/or or current across the sense resistor 70. The controller 44 can include a current comparator circuit (not shown) to use with a current feedback circuit (not shown) in regulating the duty cycle of the primary switch 48. Likewise, the controller 44 can include a voltage comparator circuit (not shown) to use with a voltage feedback circuit (not shown) in regulating the duty cycle of the primary switch 48.

The power converter 40 further includes output circuitry coupled to a secondary winding of the transformer 42 and driving circuitry for the auxiliary switch 46. The output circuitry includes a rectifier diode 62, a rectifier diode 64, and an output capacitor 66. An anode of the rectifier diode 62 is coupled to a first terminal of the secondary winding. A cathode of the rectifier diode 62 is coupled to a first terminal of the output capacitor 66 and coupled to the output node Vout. An anode of the rectifier diode 64 is coupled to a second terminal of the secondary winding. A cathode of the rectifier diode 64 is coupled to the first terminal of the output capacitor 66 and coupled to the output node Vout. The output capacitor 66 is coupled to a Vout node across an output load, represented by a resistor 68.

In some embodiments, the driving circuitry for the auxiliary switch 46 is configured such that when the voltage across the primary winding of the transformer 42 is higher than zero, the auxiliary switch 46 will be in the ON state. The driving circuitry is further configured such that when the voltage across the primary winding of the transformer 42 is equal or lower than zero, the auxiliary switch 46 will be in the OFF state.

Where the controller 44 employs force commutation for turning ON and OFF of the primary switch 48, adaptive self-commutation is used for switching the auxiliary switch 46 ON and OFF. In an exemplary embodiment, the driving circuitry for the auxiliary switch 46 is implemented using a diode 54, a diode 56, a diode 58, and a capacitor 52, as shown in FIG. 4. In an exemplary method of operating the driving circuitry of FIG. 4, at the moment that the rising edge of the voltage across the primary winding of the transformer 42 reaches zero, the body diode of the auxiliary switch 46 starts conducting. Also, diode 56 starts conducting at this point and starts charging the gate-to-source parasitic capacitance of the auxiliary switch 46 through the capacitor 52. The further rising voltage across the capacitor 50 is divided by the capacitor 52 and the addition of the gate-to-source parasitic capacitance and the gate-to-drain parasitic capacitance of the auxiliary switch 46.

When the voltage across the gate-to-source parasitic capacitance of the auxiliary switch 46 reaches the threshold voltage of the auxiliary switch 46, the auxiliary switch 46 will turn ON. It is important that the ratio between the voltage across capacitor 50 and the maximum voltage on the gate of the auxiliary switch 46 is chosen to stay within the safe operating area of the auxiliary switch 46. The ratio can be dimensioned with the value of the capacitor 52. The gate voltage of the auxiliary switch 46 will remain substantially the same until the voltage across the capacitor 50 has reduced to the same level of the gate voltage. When the voltage across the capacitor 50 further reduces, the diode 58 starts conducting and will pull the gate voltage of the auxiliary switch 46 down until it reaches the gate threshold voltage at which point the auxiliary switch 46 turns OFF. Diodes 54, 56, and 58 further prohibit the voltage across the capacitor 50 to go significantly below zero. It is understood that alternatively configured driving circuits and alternative methods for operating the driving circuit to parametrically turn the auxiliary switch ON and OFF can be implemented.

A resonant circuit is formed by the capacitors 50 and 52, the diodes 54, 56, and 58, the auxiliary switch 46 having the body diode and parasitic capacitances, and the primary winding of the transformer 42. When the auxiliary switch 46 is turned ON and the primary switch 48 is turned OFF, the capacitors 50 and 52 and the primary winding of the transformer 42 form a resonant tank. The turn-on voltage value for the auxiliary switch 46 can depend on the capacitance chosen for the capacitors 50 and 52. In this manner, the auxiliary switch 46 is parametrically controlled to turn ON and OFF without direct control of a separate control circuit.

Figure 5:
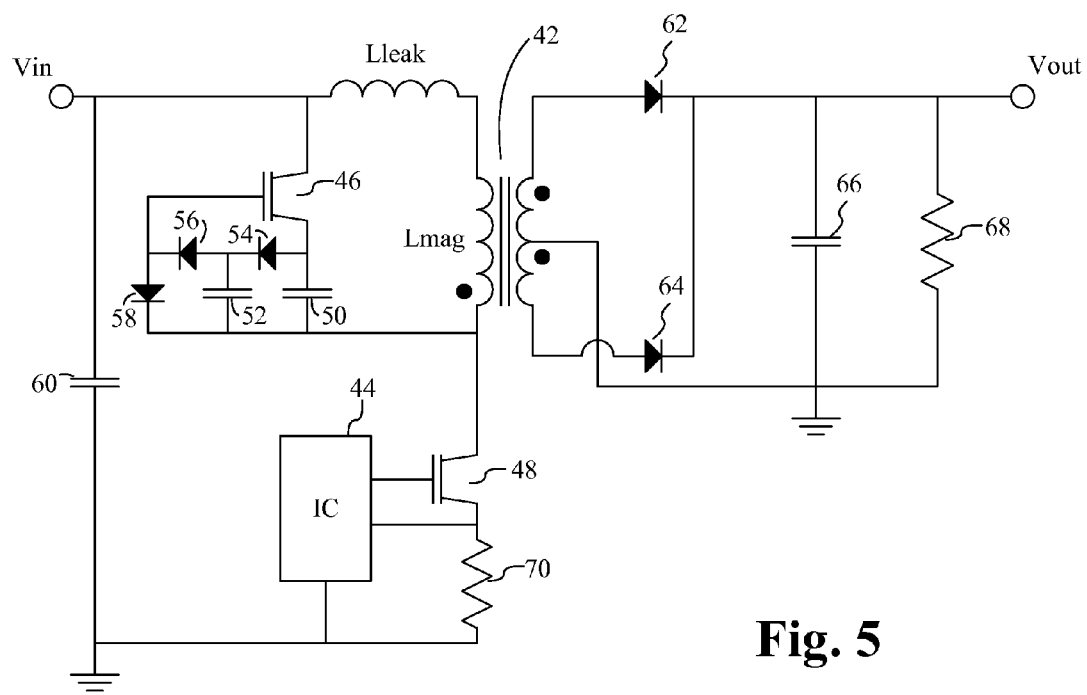
FIG. 5 illustrates a conceptualized version of the power converter circuit of FIG. 4.

FIG. 4 shows a single inductance element, the primary winding of the transformer 42. The primary winding represents both a magnetizing inductance element and a leakage inductance element. FIG. 5 illustrates a conceptualized version of the power converter of FIG. 4 showing both a magnetizing inductance element Lmag and a leakage inductance element Lleak.

The power converter is an integration of three topologies which include a forward converter topology, a flyback converter topology, and a resonant circuit topology. The combination of these three topologies functions to transfer energy using three different modes. A first mode, or forward mode, is a forward energy transfer that forwards energy from the input supply to the output load in a manner similar to a forward converter. A second mode, or flyback mode, stores and releases energy in a manner similar to a flyback converter. A third mode, or resonant mode, stores and releases energy from the resonant tank using the resonant circuit and secondary side forward-type converter topologies. The modes of energy transfer are controlled using a single control element. In the exemplary embodiment of FIG. 4, the force commutation is implemented by the controller coupled to the primary switch, and the adaptive self-commutation is implemented by the parametrically controlled auxiliary switch. The controller controls the primary switch so as to regulate output power. The parametrically controlled auxiliary switch enables power delivery using the flyback mode and the resonant mode.

While the primary switch is ON, energy is both forward transmitted to the output load and stored in the primary side as magnetizing and leakage inductance. While the primary switch is OFF, stored inductance and parasitic capacitances form resonant energy in the resonant tank which is released to the output load. The configuration of the secondary side circuit allows for delivery of resonant energy for both directions of resonant current flow through the primary winding.

Figure 6:
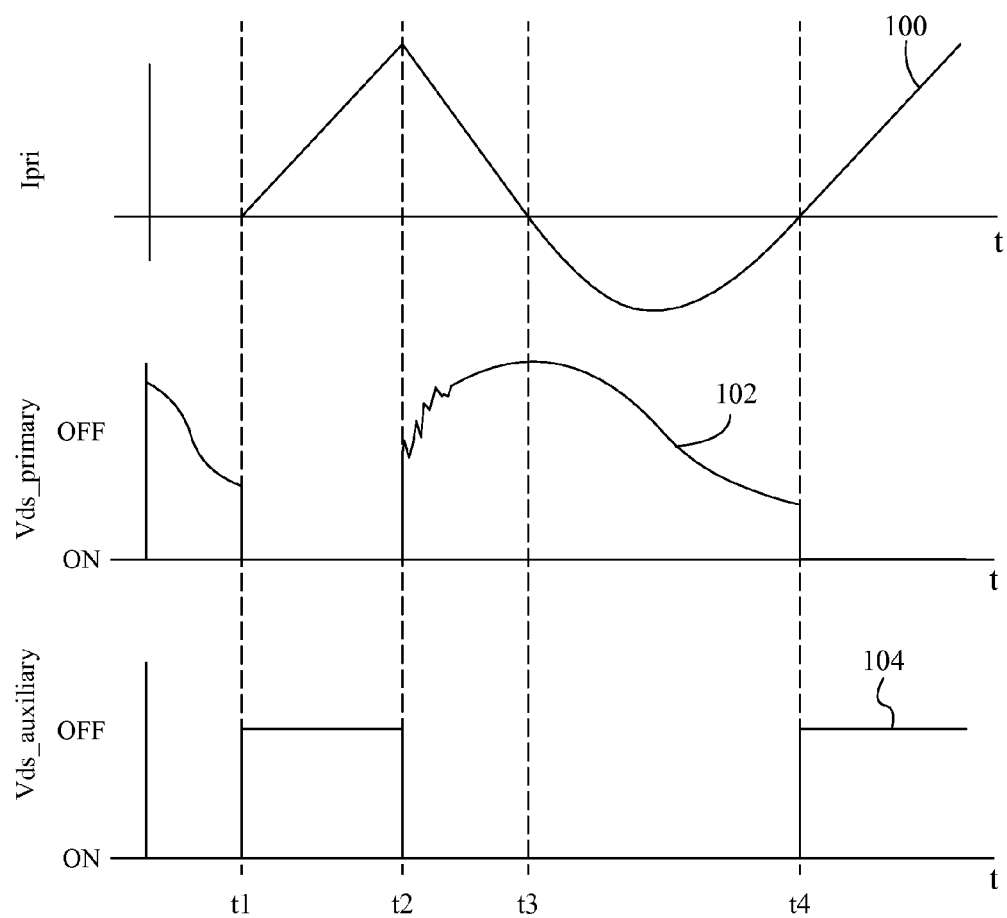
FIG. 6 illustrates exemplary voltage and current waveforms corresponding to operation of the power converter of FIG. 4.

FIG. 6 illustrates exemplary voltage and current waveforms corresponding to operation of the power converter 40 of FIG. 4. A waveform 100 shows the primary current Ipri through the primary winding of the transformer 42. A waveform 102 shows the drain-to-source voltage Vds of the primary switch 48. A waveform 104 shows the drain-to-source voltage Vds of the auxiliary switch 46.

Operation of the power converter is described in terms of the circuit in FIG. 4 and the waveforms of FIG. 6. At time t1, primary switch 48 is ON and auxiliary switch 46 is OFF. Primary switch 48 ON corresponds to the low drain-to-source voltage Vds.

From time t1 to t2, the primary switch 48 remains ON and the auxiliary switch 46 remains OFF, and the primary current Ipri rises linearly across the primary winding resulting in increasing magnetizing inductance within the primary winding.

At time t2, the primary switch 48 turns OFF and the auxiliary switch 46 turns ON. In some embodiments, there is a delay between the primary switch 48 turning OFF and the auxiliary switch 46 turning ON. This delay is a result of the time for the gate-to-source voltage of the auxiliary switch 46 to reach the turn on voltage, this delay is a function of the driving circuit configuration. The driving circuit functions such that when the voltage differential between the source and the gate of the auxiliary switch 46 reaches the turn on voltage, the auxiliary switch 48 turns ON. In this manner, the auxiliary switch 46 functions in a self-commutating mode.

From time t2 to t4, the primary switch 48 remains OFF and the auxiliary switch 46 remains ON. The drain-to-source voltage Vds across the primary switch 48 eventually dissipates, reaching zero volts, or near zero volts, at time t4.

At time t4, the primary switch 48 is turned ON using zero voltage switching or near-zero voltage switching. The controller 44 identifies when to turn ON the primary switch 48. In some embodiments, the primary switch 48 is turned ON when the energy transfer from the resonant tank is completed, and the voltage across the primary switch 48 is at or near zero for zero voltage switching. The cycle from time t1 to t4 then repeats.

As shown in the waveform diagram of FIG. 6, there is either positive or negative current through the primary winding, Ipri, except at the zero crossing points. In contrast, conventional flyback and forward converters have zero current through the primary winding when the main switch is OFF.

Figure 3:
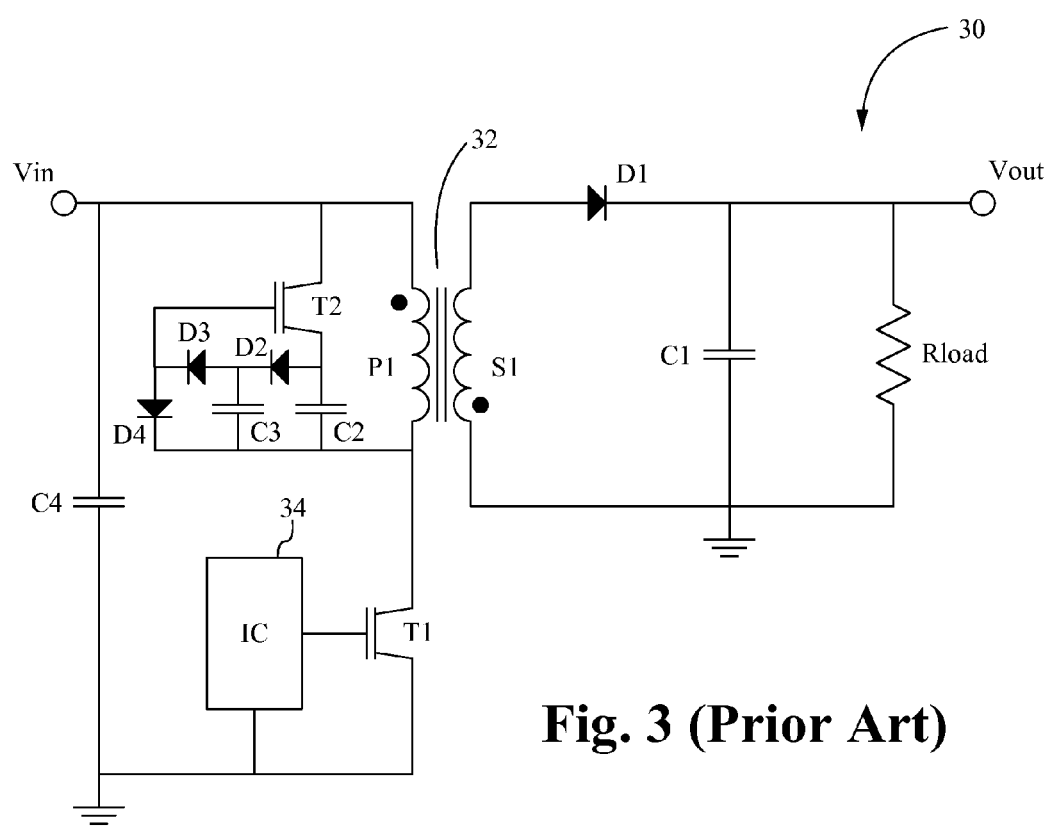
FIG. 3 illustrates the flyback type converter of Jansen.

When the primary switch 48 is ON, such as during the time period from t1 to t2, energy from the input supply is forward transmitted to the load resistor 68 via the forward biased diode 64. This energy transfer corresponds to the forward mode. The forward converter topology that enables the forward mode of energy transfer delivers energy to the output load, but the forward converter topology does not include an inductor in the output circuit to store energy. When the primary switch 48 is OFF, such as during the time period from time t2 to t4, the power converter functions in the flyback mode and the resonant mode. From time t2 to t3, the stored magnetizing inductance generates the diminishing primary current Ipri. At time t3, the energy from the magnetizing inductance is dissipated and the primary current Ipri is zero. Time t3 also corresponds to the high drain-to-source voltage Vds in waveform 102. While the auxiliary switch 46 is ON, the capacitor 50 and the primary winding form a resonant tank. After time t3, the power converter starts to resonate and generate a sinusoidal primary current from the energy stored in the resonant tank. The resonant tank functions as a bi-directional current circuit. The energy stored in the resonant tank is released to the load resistor 68 via alternating forward biased diodes 62 and 64. When the primary current flows counter-clockwise in the resonant tank, the diode 64 is forward biased and resonant energy is released to the load resistor 68 via the forward biased diode 64. When the primary current flows clockwise in the resonant tank, the diode 62 is forward biased and resonant energy is released to the load resistor 68 via the forward biased diode 62. In this manner, resonant energy is delivered to the output load during the entire resonant mode cycle of counter-clockwise and clockwise primary current flow. In contrast, the power convert 30 of FIG. 3 can only release resonant energy during clockwise primary current flow within the resonant tank, which corresponds to the diode D1 being forward biased. When the diode D1 is reverse biased, corresponding to counter-clockwise primary current flow, the resonant energy can not be released.

The primary side circuit includes a magnetizing inductance energy storage element and a leakage inductance energy storage element. As described above, the primary winding can functions as both energy storage elements, or a separate inductor can be added in series to the primary winding. While the primary switch 48 is ON, most of the energy stored in the primary winding is from leakage inductance, and most of the energy forwarded is from magnetizing inductance. The resonant tank formed while the primary switch 48 is OFF can be conceptually considered as two resonant tanks. A first resonant tank is formed by the capacitor 50 and the magnetizing inductance energy storage element. A second resonant tank is formed by the capacitor 50 and the leakage inductance energy storage element.

Energy is transferred to the output using the forward mode, such as when the primary switch 46 is ON, and the flyback and resonant modes, such as when the primary switch is OFF. Energy related to magnetizing inductance on the primary side that is forwarded to the secondary side while the primary switch is ON is transferred according to the forward mode. Energy that is stored on the primary side while the primary switch is ON and then forwarded to the secondary side while the primary switch is OFF is transferred according to the flyback mode. Some or all of the energy transferred according to the flyback mode is resonant energy stored in the resonant tank formed while the primary switch is OFF. Leakage inductances stored in the leakage inductance energy storage element and parasitic capacitances of the main and auxiliary switches result in resonant energy stored in the resonant tank. The resonant energy is forwarded to the secondary side while the primary switch is OFF. In this manner, the power converter continuously transfers energy, when the primary switch is ON and OFF.

Figure 1:
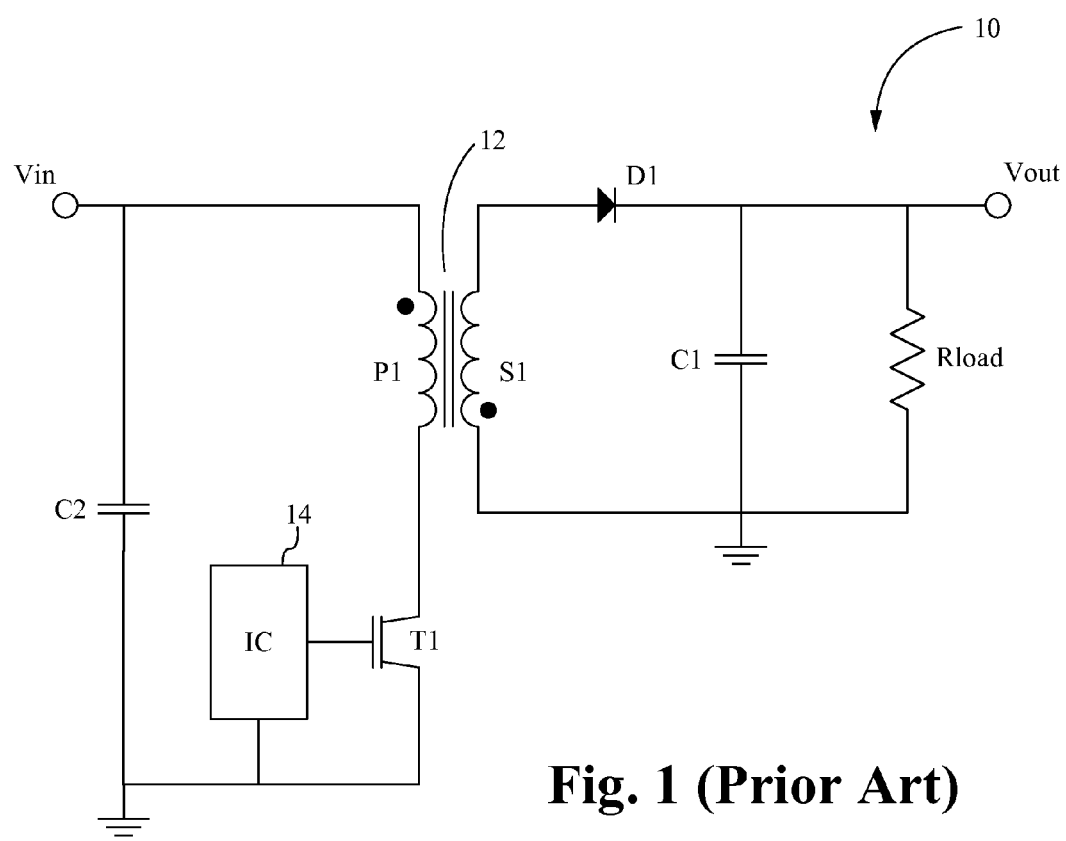
FIG. 1 illustrates a conventional flyback type voltage converter.
Figure 2:
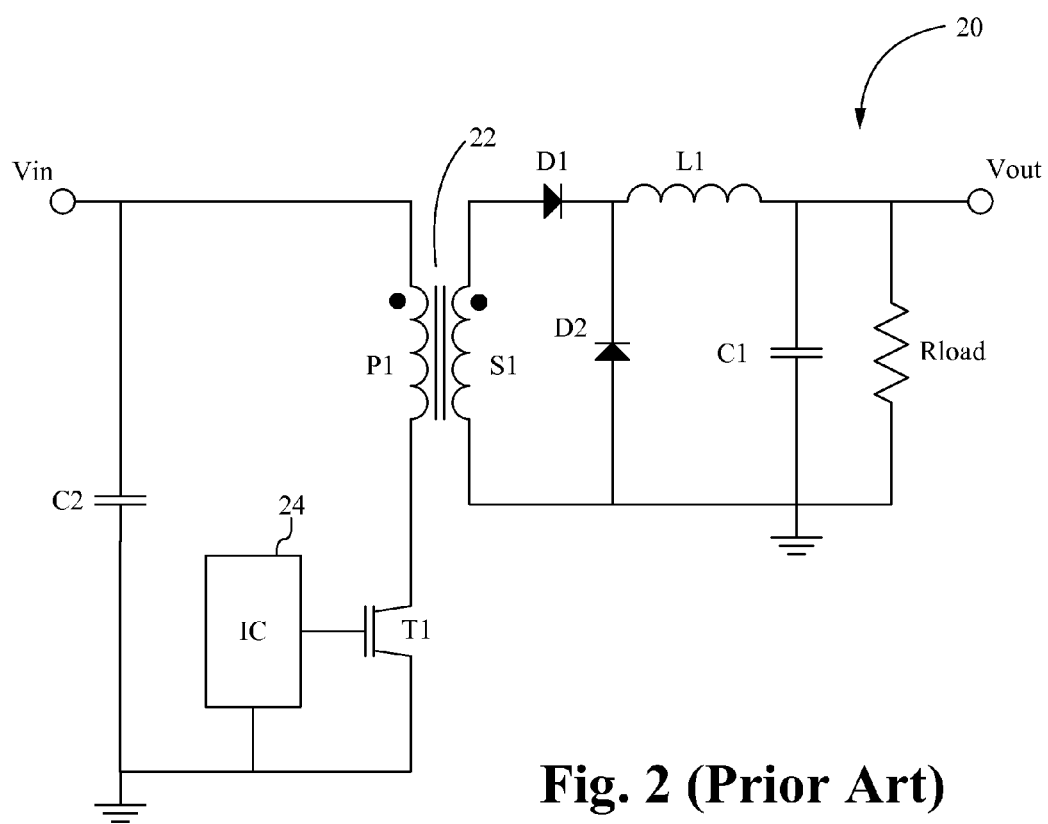
FIG. 2 illustrates a conventional forward type voltage converter.

In some embodiments, the leakage inductance is increased intentionally so as to store more resonant energy. In some embodiments, a transformer is used in which a portion of the primary and secondary magnetic fields are purposely decoupled to generate greater leakage inductance. By way of example, the conventional flyback converter 10 of FIG. 1 uses a transformer built so as to minimize leakage inductance. In an exemplary configuration, the conventional flyback converter circuit may have 1% leakage of the circuit magnetizing inductance. If the magnetizing inductance is 1 millihenry (mH), the leakage inductance is 10 microhenries (uH). In an exemplary implementation of the power converter of the present application, the circuit is designed to have leakage inductance of approximately 200 uH. So what the circuit loses by way of parasitics is more than made up for in increased energy delivered to the load by way of resonant energy. Care must be taken to not have the parasitic capacitance of the switch be too high or else the switches will become over-stressed when it turns ON.

Figure 7:
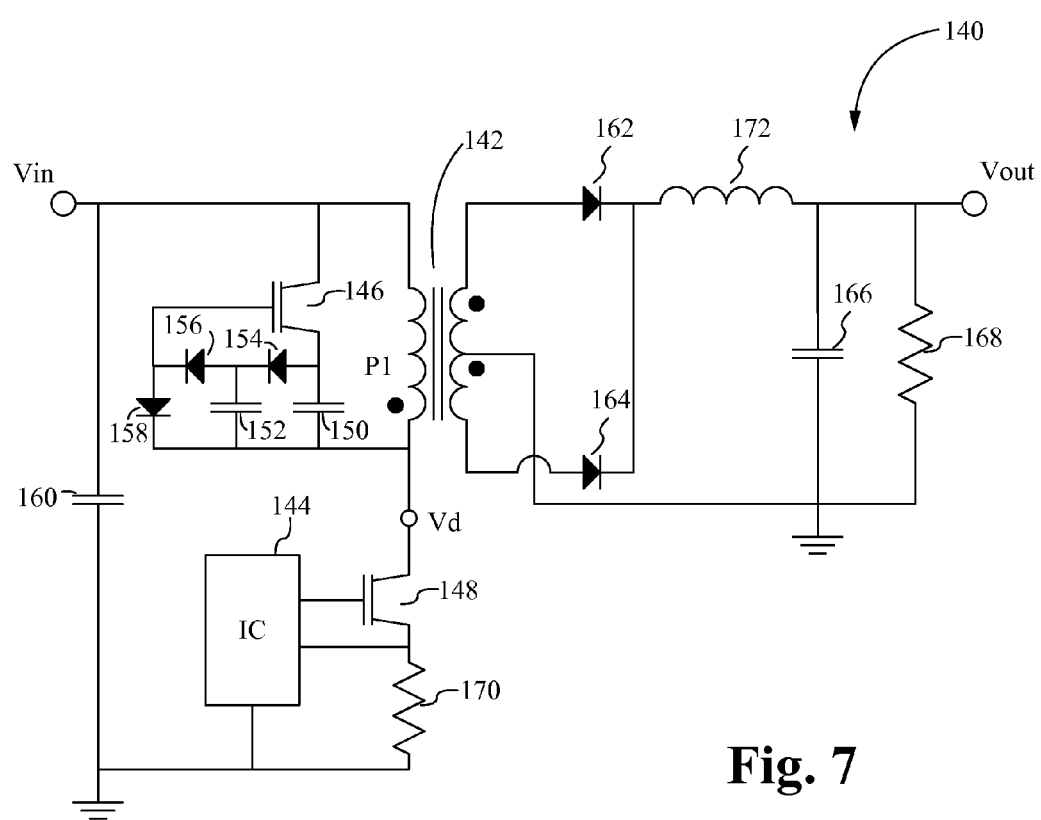
FIG. 7 illustrates a power converter according to another embodiment.

The power converter 40 of FIG. 4 does not include an inductor in the secondary side output circuit. In alternative embodiments, the power converter is modified to include an inductor in the secondary side of the output circuit. FIG. 7 illustrates a power converter according to another embodiment. The power converter 140 includes a primary switch 148, an auxiliary switch 146, a controller 144, a transformer 142, and a capacitor 150. The power converter 140 further includes output circuitry coupled to a secondary winding of the transformer 142 and driving circuitry for the auxiliary switch 146. The output circuitry includes a rectifier diode 162, a rectifier diode 164, an inductor 172, and an output capacitor 166. An anode of the rectifier diode 162 is coupled to a first terminal of the secondary winding. A cathode of the rectifier diode 162 is coupled to a first terminal of the inductor 172. A second terminal of the inductor 172 is coupled to the output capacitor 66 and coupled to the output node Vout. An anode of the rectifier diode 164 is coupled to a second terminal of the secondary winding. A cathode of the rectifier diode 164 is coupled to the first terminal of the inductor 172. The output capacitor 166 is coupled to a Vout node across an output load, represented by a resistor 168. In an exemplary embodiment, the driving circuitry for the auxiliary switch 146 is implemented using a diode 154, a diode 156, a diode 158, and a capacitor 152, as shown in FIG. 7. The driving circuitry for the auxiliary switch 146 functions similarly as the driving circuitry for the auxiliary switch 46 in FIG. 4.

The power converter 140 is an integration of three topologies which include a forward converter topology, a flyback converter topology, and a resonant circuit topology. The combination of these three topologies functions to transfer energy using three different modes in a manner similar to the power converter 40 described above. However, whereas the power converter 40 is voltage driven and feeds in voltage (voltage Fed), or a voltage mode of operation, the power converter 140 of FIG. 7 is current driven and feeds in current (current Fed), or a current mode of operation.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power converter circuit comprising:
   a transformer having a primary winding coupled to an input power supply and a secondary winding;
   an output circuit coupled to the secondary winding, wherein the output circuit comprises a first diode, a second diode, an inductor, and a capacitor, further wherein the first diode and the second diode are coupled to the secondary winding of the transformer such that when the first diode is forward biased, the second diode is reverse biased, and when the first diode is reverse biased, the second diode is forward biased;
   a primary switch coupled in series to the primary winding;
   a sense resistor coupled in series with the primary switch on the opposite side as the primary winding;
   a resonant circuit including an auxiliary switch serially coupled to a tank capacitor that are together coupled in parallel to the primary winding, wherein when the primary switch is OFF the tank capacitor and the primary winding form a resonant tank; and
   a controller coupled to the primary switch and coupled to a node between the primary switch and the sense resistor such that the controller is able to sense voltage or current conditions within the power converter circuit;
   wherein the power converter circuit is configured to:
   forward energy from the input power supply to the output circuit;
   store energy from leakage inductance, magnetizing inductance, and parasitic capacitances as resonant energy in the resonant tank; and
   deliver stored resonant energy to the output circuit.

2. The power converter circuit of claim 1 wherein the power converter circuit is configured to forward energy from the input power supply to the output circuit when the primary switch is ON.

3. The power converter circuit of claim 1 wherein the parasitic capacitances comprise parasitic capacitances from the auxiliary switch and the primary switch.

4. The power converter circuit of claim 1 wherein the resonant energy is delivered over an entire resonant cycle of the resonant tank, wherein the resonant cycle comprises a positive primary winding current flow and a negative primary winding current flow.

5. The power converter circuit of claim 1 wherein energy delivered to the output circuit comprises a summation of energy forwarded from:
the input power supply;
resonant energy stored and released by the resonant tank; and
parasitic capacitances and leakage inductance stored and released as additional resonant energy by the resonant tank.

6. The power converter circuit of claim 1 wherein the auxiliary switch comprises a parametrically controlled auxiliary switch.

7. The power converter circuit of claim 6 further comprising driving circuitry coupled to the auxiliary switch and to the primary switch, wherein the driving circuitry is configured to parametrically control the auxiliary switch according to a voltage condition of the primary switch.

8. The power converter circuit of claim 1 wherein the resonant circuit, the transformer, and the output circuit are configured to store and release the resonant energy according to a flyback mode of energy conversion.

9. The power converter circuit of claim 8 wherein during the flyback mode of energy conversion, the primary switch is OFF.

10. The power converter circuit of claim 1 wherein an anode of the first diode is coupled to a first terminal of the secondary winding, an anode of the second diode is coupled to a second terminal of the secondary winding, a cathode of the first diode and a cathode of the second diode are each coupled to a first terminal of the inductor, and a second terminal of the inductor is coupled to the capacitor.

11. The power converter circuit of claim 1 wherein a primary winding current rises linearly to a peak value when the primary switch is ON.

12. A power converter circuit comprising:
a transformer having a primary winding coupled to an input power supply and a secondary winding;
an output circuit coupled to the secondary winding, wherein the output circuit comprises a first diode, a second diode, an inductor, and a capacitor, further wherein the first diode and the second diode are coupled to the secondary winding of the transformer such that when the first diode is forward biased, the second diode is reverse biased, and when the first diode is reverse biased, the second diode is forward biased;
a primary switch coupled in series to the primary winding;
a sense resistor coupled in series with the primary switch on the opposite side as the primary winding;
a resonant circuit including an auxiliary switch serially coupled to a tank capacitor that are together coupled in parallel to the primary winding, wherein when the primary switch is OFF the tank capacitor and primary winding form a resonant tank;
driving circuitry coupled to the auxiliary switch and to the primary switch, wherein the driving circuitry is configured to parametrically control the auxiliary switch according to a voltage condition of the primary switch; and
a controller coupled to the primary switch and coupled to a node between the primary switch and the sense resistor such that the controller is able to sense voltage or current conditions within the power converter circuit;
wherein the power converter circuit is configured to:

forward energy from the input power supply to the output circuit;
store energy from leakage inductance, magnetizing inductance, and parasitic capacitances as resonant energy in the resonant tank; and
deliver stored resonant energy to the output circuit.

13. The power converter circuit of claim 12 wherein an anode of the first diode is coupled to a first terminal of the secondary winding, an anode of the second diode is coupled to a second terminal of the secondary winding, a cathode of the first diode and a cathode of the second diode are each coupled to a first terminal of the inductor, and a second terminal of the inductor is coupled to the capacitor.

14. A method of transferring energy using a power converter, the method comprising:
configuring the power converter comprising a transformer having a primary winding coupled to an input power supply and a secondary winding, an output circuit having an inductor coupled to the secondary winding, and a primary switch coupled in series between the primary winding and a sense resistor;
controlling operation of the primary switch with a controller coupled to the primary switch based on a sensed voltage or current at a node between the primary switch and the sense resistor to which the controller is coupled;
forwarding energy from the input power supply to the output circuit while the primary switch is ON;
forming a resonant tank including an auxiliary switch serially coupled to a tank capacitor that are together coupled in parallel to the primary winding when the primary switch is OFF, wherein the resonant tank includes resonant energy derived from stored magnetizing inductance, stored leakage inductance and parasitic capacitances; and
delivering the resonant energy in the resonant tank to the output circuit while the primary switch is OFF.

15. The method of claim 14 wherein energy is continuously transferred from a primary side of the power converter to the output circuit while the primary switch is both ON and OFF.

16. The method of claim 14 wherein the parasitic capacitances comprise parasitic capacitances from the auxiliary switch and the primary switch.

17. The method of claim 14 wherein the resonant energy is delivered over an entire resonant cycle of the resonant tank, wherein the resonant tank includes the primary winding and the resonant cycle comprises a positive primary winding current flow and a negative primary winding current flow.

18. The method of claim 17 wherein the auxiliary switch turns ON and OFF according to a voltage condition of the primary switch.

19. The method of claim 14 wherein energy delivered to the output circuit comprises a summation of energy forwarded from:
the input power supply;
resonant energy stored and released by the resonant tank; and
parasitic capacitances and leakage inductance stored and released as additional resonant energy by the resonant tank.

20. The method of claim 14 further comprising controlling the auxiliary switch through self-commutation.

21. The method of claim 20 wherein during the flyback mode of energy conversion, the primary switch is OFF.

22. The method of claim 14 wherein the resonant energy is stored and delivered according to a flyback mode of energy conversion.

23. The method of claim 14 wherein the output circuit comprises a first diode, a second diode, and a capacitor, the first diode and the second diode are coupled to the secondary winding of the transformer such that when the first diode is forward biased, the second diode is reverse biased, and when the first diode is reverse biased, the second diode is forward biased.

24. The method of claim 14 wherein a primary winding current rises linearly to a peak value when the primary switch is ON.

* * * * *